United States Patent
Yamamoto et al.

(10) Patent No.: US 12,191,787 B2
(45) Date of Patent: Jan. 7, 2025

(54) MOTOR DRIVE APPARATUS

(71) Applicant: Carrier Japan Corporation, Tokyo (JP)

(72) Inventors: Kenta Yamamoto, Fuji (JP); Masaki Kanamori, Fuji (JP); Yohei Kubota, Fuji (JP); Keiichi Kato, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 75 days.

(21) Appl. No.: 18/170,899

(22) Filed: Feb. 17, 2023

(65) Prior Publication Data
US 2023/0208337 A1  Jun. 29, 2023

Related U.S. Application Data

(63) Continuation of application No. PCT/JP2020/031095, filed on Aug. 18, 2020.

(51) Int. Cl.
*H02P 25/22* (2006.01)
*H02P 27/06* (2006.01)

(52) U.S. Cl.
CPC ............ *H02P 25/22* (2013.01); *H02P 27/06* (2013.01); *H02P 2201/03* (2013.01)

(58) Field of Classification Search
CPC .. H02P 27/04; H02P 27/06; H02P 6/08; H02P 25/03; H02P 25/062; H02P 25/064; H02P 25/107; H02P 2207/05; H02P 2207/07; H02P 2209/03; H02P 2201/13; H02P 2201/03; H02P 29/60; H02P 6/085; H02K 11/33; H02J 7/007192; B60L 2210/40; H02M 7/5387; H02M 7/493; H01G 11/50
See application file for complete search history.

(56) References Cited

U.S. PATENT DOCUMENTS

| | | | |
|---|---|---|---|
| 6,181,590 B1 | 1/2001 | Yamane et al. | |
| 2021/0146782 A1* | 5/2021 | Lehn | H02J 15/00 |

FOREIGN PATENT DOCUMENTS

| | | |
|---|---|---|
| JP | 2000350474 A | 12/2000 |
| JP | 2003018863 A | 1/2003 |
| JP | 2011062051 A | 3/2011 |
| JP | 201648997 A | 4/2016 |
| JP | 2019176554 A | 10/2019 |
| JP | 2020072621 A | 5/2020 |

OTHER PUBLICATIONS

The PCT Search Report and Written Opinion mailed on Jun. 10, 2020 for PCT Application No. PCT/JP2020/031095, 18 pages.

* cited by examiner

*Primary Examiner* — Antony M Paul
(74) *Attorney, Agent, or Firm* — Lee & Hayes, P.C.

(57) ABSTRACT

According to one embodiment, a motor drive apparatus is an apparatus which drives a motor including a plurality of phase windings in a mutually unconnected state, and includes first and second inverters. The first and second inverters are first and second modules each of which is configured in such a manner that a switching circuit including a positive side terminal and negative side terminals and a drive circuit intended to drive the switching circuit are accommodated in one package, and which possess configurations identical to each other, and the first and second modules are arranged on a circuit board in a state where the negative side terminals of the modules are respectively close to each other.

9 Claims, 4 Drawing Sheets

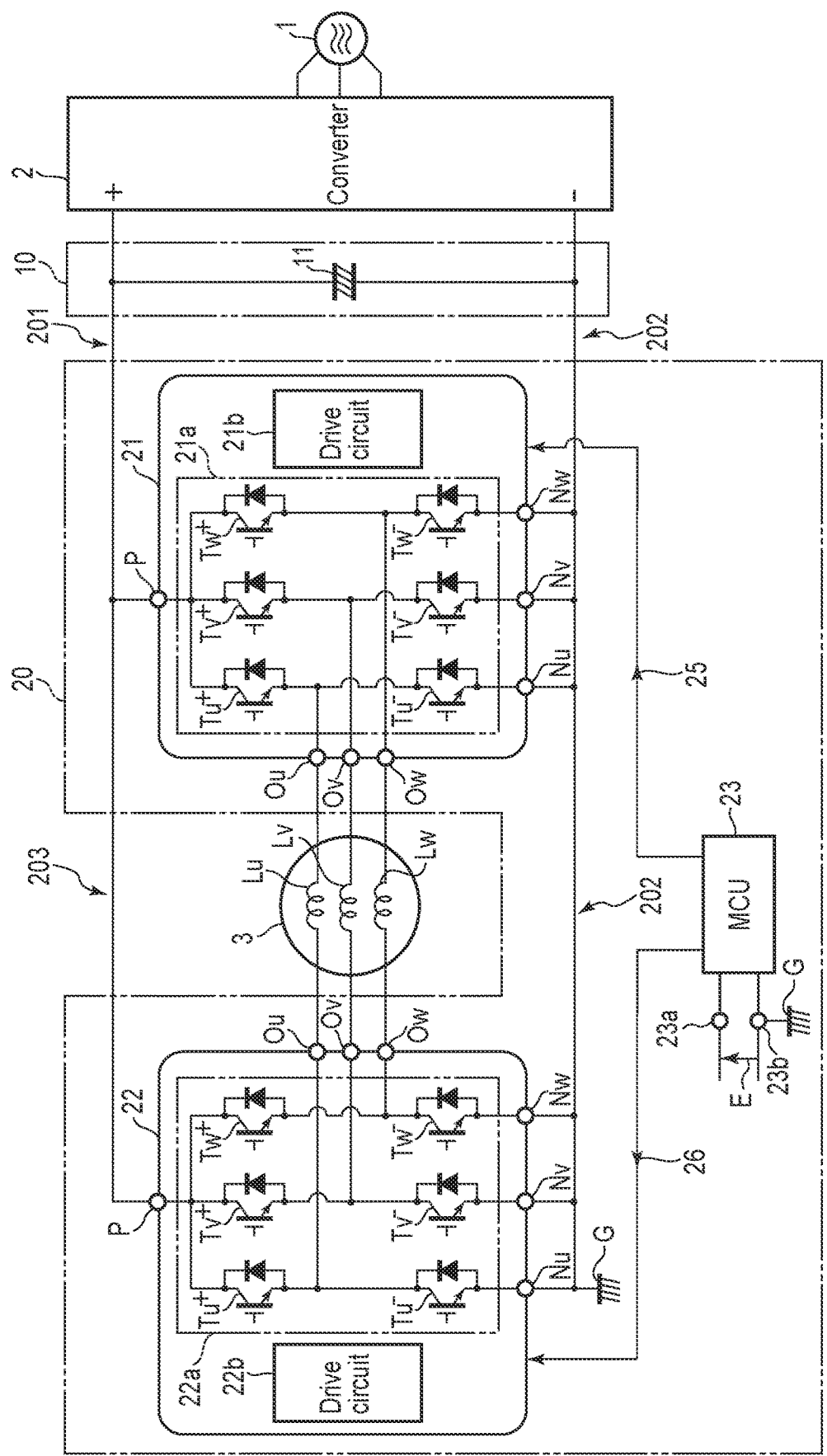
F I G. 1

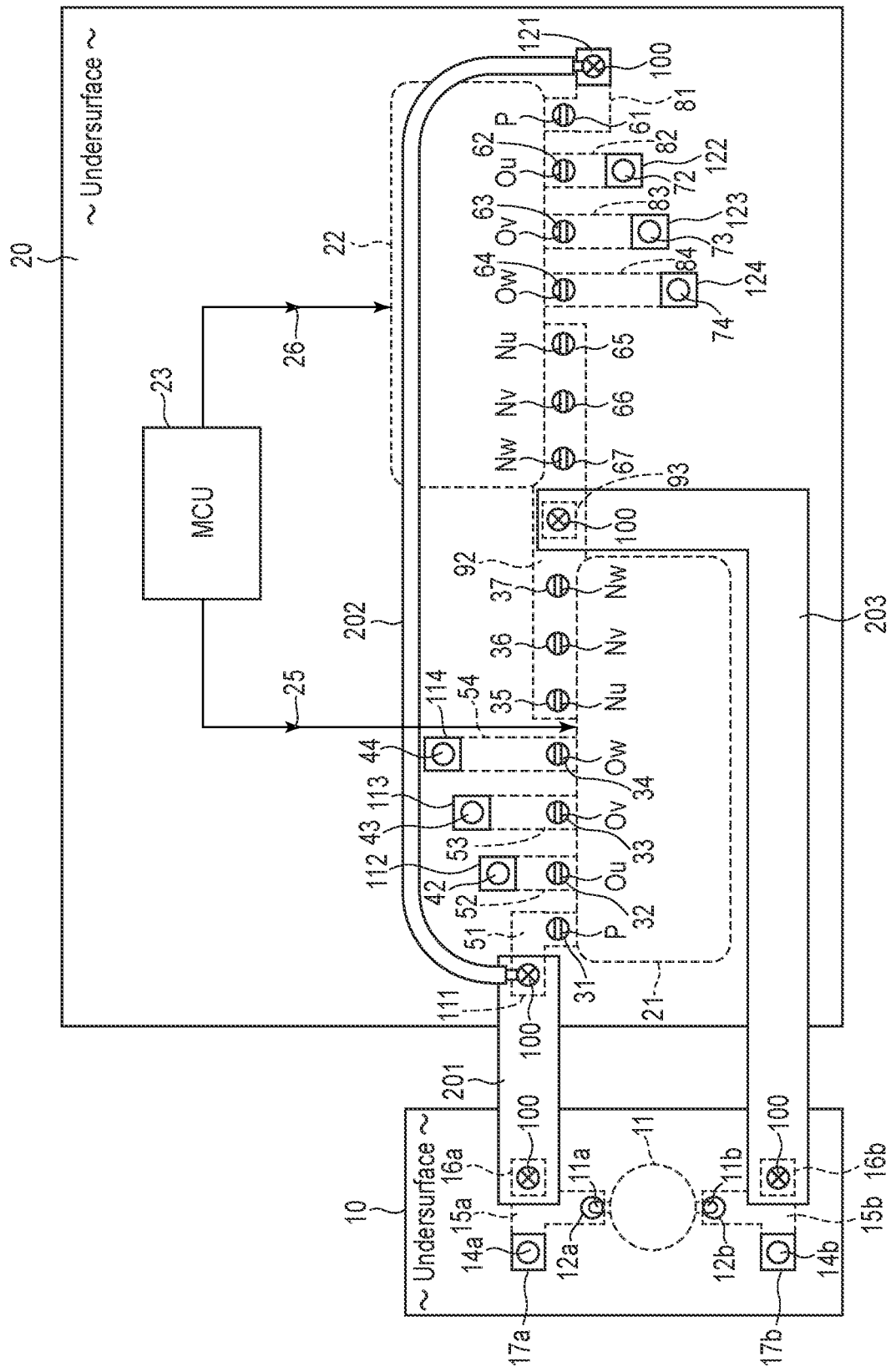
F I G. 3

MOTOR DRIVE APPARATUS

CROSS-REFERENCE TO RELATED APPLICATIONS

This application is a Continuation application of PCT Application No. PCT/JP2020/031095, filed Aug. 18, 2020, the entire contents of which are incorporated herein by reference.

FIELD

Embodiments described herein relate generally to a motor drive apparatus configured to drive a motor including a plurality of phase windings in a mutually unconnected state.

BACKGROUND

As a motor configured to drive a compressor or the like, a permanent magnet synchronous motor (also referred to as a DC brushless motor) including a plurality of phase windings is used. As an example of the permanent magnet synchronous motor, an open-winding motor including a plurality of phase windings in a mutually unconnected state is known.

A motor drive apparatus configured to drive the open-winding motor (abbreviated as a motor) includes a converter configured to convert AC power source voltages into a DC voltage, capacitor configured to smooth an output voltage of the converter, first inverter configured to control electrification of portions between the capacitor and one ends of the phase windings of the motor, and second inverter configured to control electrification of portions between the capacitor and the other ends of the phase windings of the motor, and drives the motor by appropriately switching the first and second inverters.

In order to downsize the aforementioned motor drive apparatus, it is conceivable that the first and second inverters are to be mounted on one circuit board. Extremely small parasitic inductances occur to conduction paths between the inverters arranged on the aforementioned circuit board and connected to the same capacitor of the same DC section. Due to an influence of the parasitic inductances, a switching operation of one inverter is superimposed on a drive signal for switching of the other inverter as noise and, concomitantly with the superimposition, the inverter malfunctions in some cases.

An embodiment described herein aims to provide a motor drive apparatus capable of preventing malfunctions of inverters from occurring by appropriately arranging the inverters on a circuit board and thereby reducing parasitic inductances on conduction paths.

BRIEF DESCRIPTION OF THE DRAWINGS

FIG. 1 is a block diagram showing the configuration of an embodiment.

FIG. 3 is view in which the circuit board in the embodiment is viewed from the reverse side.

DETAILED DESCRIPTION

Figure 2:
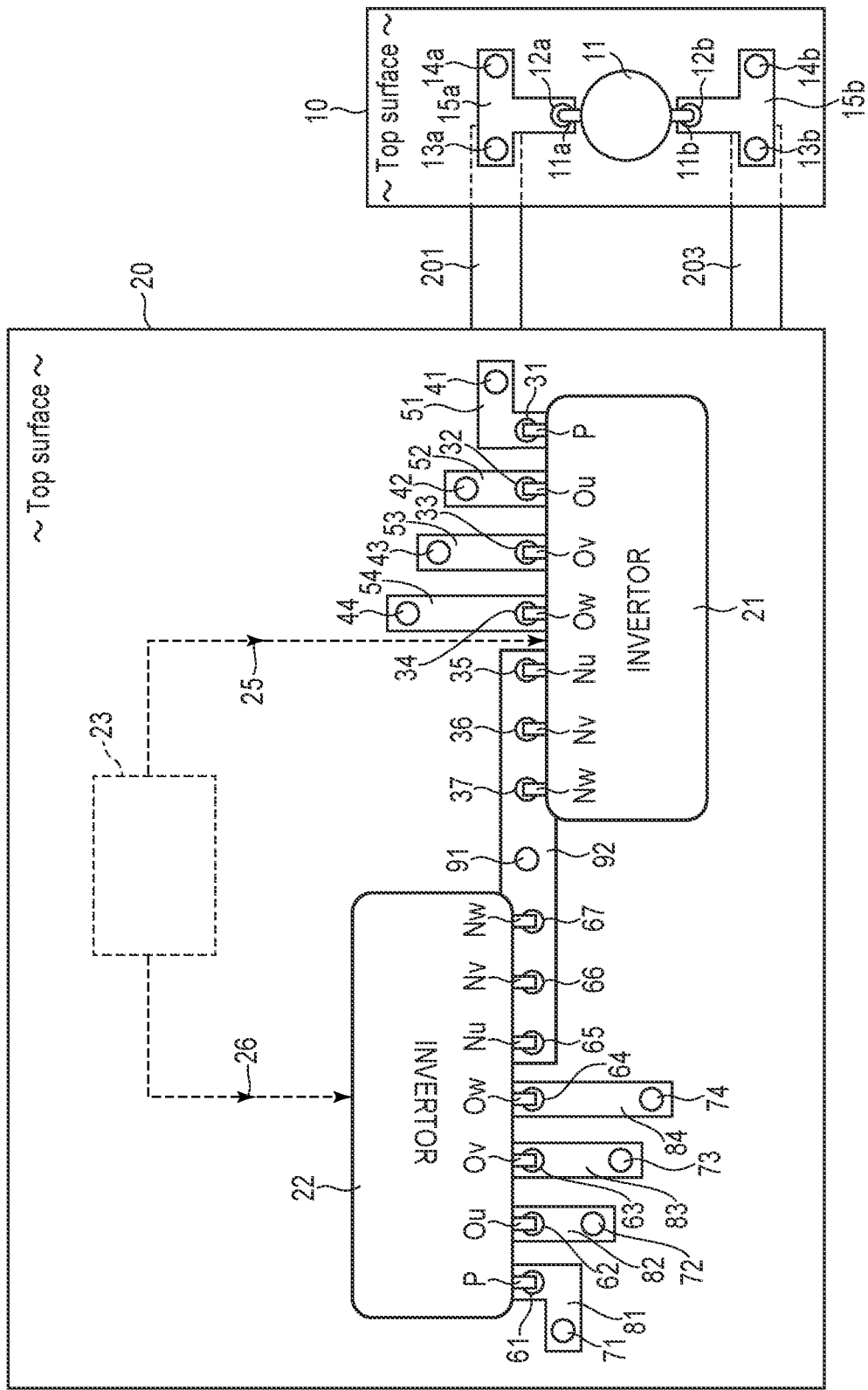
FIG. 2 is a view in which a circuit board in the embodiment is viewed from the obverse side.

Hereinafter a motor drive apparatus of an embodiment will be described with reference to the accompanying drawings.

In general, according to one embodiment, as shown in FIG. 1, a converter 2 such as a full-wave rectifying circuit or the like is connected to a three-phase AC power source 1, and capacitor (electrolytic capacitor) 11 of a capacitor board 10 is connected to a positive side output end (+) and negative side output end (−) of the converter 2. The converter 2 converts the three-phase AC voltages of the three-phase AC power source 1 into a DC voltage and outputs the DC voltage. The capacitor 11 is configured to smooth the output voltage of the converter 2. Although in FIG. 1, one capacitor 11 is shown, a plurality of capacitors may be connected in parallel to each other, may be connected in series or furthermore, the capacitor 11 may be configured as a combination of parallel-connected and series-connected capacitors according to the capacity of the motor drive apparatus.

To the positive side terminal and negative side terminal of the capacitor 11, the first inverter 21 and second inverter 22 mounted on the same circuit board 20 are connected and, between output ends of the first inverter 21 and output ends of the second inverter 22, a motor 3 is connected. The motor 3 is for example, a three-phase permanent magnet synchronous motor configured to drive a compressor and including a plurality of phase windings Lu, Lv, and Lw which are in a mutually unconnected state, i.e., a so-called open-winding motor.

The first inverter 21 is a module configured by accommodating a switching circuit 21a formed by bridge-connecting a U-phase series circuit of a switch element Tu+ and Tu−, V-phase series circuit of a switch element Tv+ and Tv−, and W-phase series circuit of a switch element Tw+ and Tw−, and drive circuit 21b configured to drive the switching circuit 21a in a rectangular package, i.e., a so-called intelligent power module (IPM), and controls electrification of portions between the capacitor 11 and one ends of the phase windings Lu, Lv, and Lw of the motor 3. The switching circuit 21a includes a positive side terminal P electrically connected to each of positive side terminals of the U-phase series circuit, V-phase series circuit, and W-phase series circuit, negative side terminal Nu of the U-phase series circuit, Nv of the V-phase series circuit, and Nw of the W-phase series circuit, converts a voltage of the capacitor 11 to be applied between the positive side terminal P and each of the negative side terminals Nu, Nv, and Nw into an AC voltage of a predetermined frequency, and outputs each AC voltage from an output terminal Ou which is an interconnection point between the switch element Tu+ and Tu−, output terminal Ov which is an interconnection point between the switch element TV+ and TV−, and output terminal Ow which is an interconnection point between the switch element Tw+ and Tw−. To the output terminals Ou, Ov, and Ow, one ends of the phase windings Lu, Lv, and Lw of the motor 3 are respectively connected.

The second inverter 22 is an IPM having the same configuration as the first inverter 21 and configured by accommodating a switching circuit 22a formed by bridge-connecting a U-phase series circuit of a switch element Tu+ and Tu−, V-phase series circuit of a switch element Tv+ and Tv−, and W-phase series circuit of a switch element Tw+ and Tw−, and drive circuit 22b configured to drive the switching circuit 22a in a rectangular package, and controls electrification of portions between the capacitor 11 and the other ends of the phase windings Lu, Lv, and Lw of the motor 3.

The switching circuit 22a includes a positive side terminal P electrically connected to each of positive side terminals of the U-phase series circuit, V-phase series circuit, and W-phase series circuit, negative side terminal Nu of the U-phase series circuit, Nv of the V-phase series circuit, and Nw of the W-phase series circuit, converts a voltage of the capacitor 11 to be applied between the positive side terminal P and each of the negative side terminals Nu, Nv, and Nw into an AC voltage of a predetermined frequency, and outputs each AC voltage from an output terminal Ou which is an interconnection point between the switch element Tu+ and Tu−, output terminal Ov which is an interconnection point between the switch element TV+ and TV−, and output terminal Ow which is an interconnection point between the switch element Tw+ and Tw−. To the output terminals Ou, Ov, and Ow, the other ends of the phase windings Lu, Lv, and Lw of the motor 3 are respectively connected. It should be noted that the first and second inverters 21 and 22 may be those provided with elements of different ratings.

The first and second inverters 21 and 22 are hereinafter referred to as IPMs 21 and 22.

A microcomputer unit (MCU) 23 configured to control the IPMs 21 and 22 is mounted on a circuit board 20. The MCU 23 operates on the basis of a DC operation voltage E to be applied between a positive side power-supply terminal 23a and negative side power-supply terminal 23b, calculates a rotational speed of the motor 3 satisfying a target temperature to be specified by, for example, a controller of an air conditioner outside the circuit board 20 as a target rotational speed, and controls on/off duty of drive signals 25 and 26 for switching of the switching circuits 21a and 22a of the IPMs 21 and 22 in such a manner that the rotational speed of the motor 3 becomes the target rotational speed. The ground potential G of the operation voltage E of the MCU 23 is common to the potential G of each of the negative side terminals Nu, Nv, and Nw of the switching circuits 21a and 22a of the IPMs 21 and 22 as the reference potential at the time when the switching drive signals for the IPMs 21 and 22 are to be created. The operation voltage E of the MCU 23 may be created by stepping down the output of the converter 2 or may be directly created from the AC power source 1.

The external appearance of the obverse side (top surface side) of the circuit board 20 on which the IPMs 21 and 22 are mounted and external appearance of the obverse side of the capacitor board 10 on which the capacitor 11 is mounted are shown in FIG. 2, and external appearance of the reverse side (undersurface side) of the circuit board 20 and external appearance of the reverse side of the capacitor board 10 are shown in FIG. 3.

[Configuration of Circuit Board 20 on the Obverse Side]

As shown in FIG. 2, the IPM 21 is configured in such a manner that the positive side terminal P, output terminals Ou, Ov, and Ow, and negative side terminals Nu, Nv, and Nw each having a shape protruding from one of side faces of a package and bent toward the undersurface side of the package are arranged in sequence in a line, and tip ends of these terminals are inserted into a plurality of insertion holes (also referred to as through holes) 31 to 37 arranged in a line along the surface of the circuit board 20, whereby the package is attached to the circuit board 20 in a state where a certain gap is held between the undersurface of the package and circuit board 20.

On the obverse side of the circuit board 20 and, in the vicinities of the insertion holes 31 to 34 into which the positive side terminal P, and output terminals Ou, Ov and Ow are to be inserted, insertion holes 41 to 44 into which connection terminals 111 to 114 to be described later are to be inserted for connection are formed and, from the positions of the insertion holes 41 to 44 to the positions of the insertion holes 31 to 34, belt-like conductive patterns 51 to 54 are formed. To these conductive patterns 51 to 54, the positive side terminal P, and output terminals Ou, Ov, and Ow inside the insertion holes 31 to 34 are respectively solder-connected.

On the obverse side of the circuit board 20, at a position adjacent to the insertion holes 35 to 37 into which the negative side terminals Nu, Nv, and Nw are to be inserted, an insertion hole 91 for insertion and connection of a connection terminal 93 to be described later is formed and, from the positions of the insertion holes 35 to 37 to the position of the insertion hole 91, for example, a belt-like conductive pattern 92 constituting a first conductive member along with a bus-bar 203 to be described later is formed. To this conductive pattern 92, the negative side terminals Nu, Nv, and Nw inside the insertion holes 35 to 37 are each solder-connected.

On the other hand, the IPM 22, as in the case of the above-described IPM 21, the IPM 22 is configured in such a manner that the positive side terminal P, output terminals Ou, Ov, and Ow, and negative side terminals Nu, Nv, and Nw each protruding from one side face of a package and bent toward the undersurface side of the package are arranged in sequence in a line, and tip ends of these terminals are inserted into a plurality of insertion holes 61 to 67 arranged in a line along the surface of the circuit board 20, whereby the package is attached to the circuit board 20.

The insertion holes 61 to 67 are formed at positions on the opposite side of the insertion holes 31 to 37 for the IPM 21 with the insertion hole 91 centered, and in the same direction as the arrangement direction of the insertion holes 31 to 37. Further, from the position of the insertion hole 91 to the positions of the insertion holes 67 to 65 into which the negative side terminals Nw, Nv, and Nu of the IPM 22 are to be inserted, the aforementioned conductive pattern 92 is extended and, to the extended conductive pattern 92, the negative side terminals Nu, Nv, and Nw inside the insertion holes 65 to 67 are each solder-connected. It should be noted that although in the above description, a package in which the terminals Nu to P of each of the IPMs 21 and 22 are provided at regular intervals in a linear arrangement is shown as an example, there is also a case of a package in which these terminals are arranged in a staggered form or intervals between the terminals are not definite.

On the obverse side of the circuit board 20 and, in the vicinities of the insertion holes 61 to 64 into which the positive side terminal P, and output terminals Ou, Ov, and Ow are to be inserted, insertion holes 71 to 74 for insertion and connection of connection terminals 121 to 124 (to be described later) on the reverse side thereof are formed, and belt-like conductive patterns 81 to 84 are respectively formed from the positions of the insertion holes 71 to 74 to the positions of the insertion holes 61 to 64. To these conductive patterns 81 to 84, the positive side terminal P, and output terminals Ou, Ov, and Ow inside the insertion holes 61 to 64 are solder-connected.

Regarding the arrangement of the IPM 21 and IPM 22, a state where the IPMs 21 and 22 are opposite from each other in point symmetry by 180° in terms of the rotational attitude so as to be separate from each other to right and left with the insertion hole 91 and conductive pattern 92 held between them, i.e., a state where the negative side terminals Nu, Nv, and Nw of both the IPMs 21 and 22 are respectively made close to each other is maintained. Owing to this arrangement of the IPMs 21 and 22, it is possible to make the negative side terminals Nu, Nv, and Nw of both the IPMs 21 and 22 respectively close to each other. Conversely, the positive side terminals P of both the IPMs 21 and 22 are located at positions farthest from each other, i.e., at positions on the extreme right and on the extreme left of the circuit board 20. Although here, the IPMs 21 and 22 are attached to the circuit board 20 in such a manner that the negative side terminals Nu, Nv, and Nw of both the IPMs 21 and 22 are arranged approximately side by side in a line, the IPMs 21 and 22 may also be attached to the circuit board 20 in such a manner that the negative side terminals Nu, Nv, and Nw of the IPM 21 and negative side terminals Nu, Nv, and Nw of the IPM 22 are arranged one above the other. In this case, the negative side terminals Nu, Nv, and Nw of the IPM 21 are positioned in such a manner as to be respectively opposed to the negative side terminals Nw, Nv, and Nu of the IPM 22. In this arrangement, when the circuit board 20 is viewed from the obverse side thereof as shown in FIG. 2, the IPMs 21 and 22 are in such a positional relationship that the negative side terminals of the IPM 21 and negative side terminals of the IPM 22 overlap each other in the top-bottom direction, and IPM 22 is shifted to the upper left side of the IPM 21.

It should be noted that the heat generation amounts during operation of the IPMs 21 and 22 are large, and hence actually heat sinks made of a material having high thermal conductivity such as aluminum or the like are firmly fixed to the top surfaces of the packages. The heat sinks may be fixed to the packages separately from each other or may be integrated with each other into one body (integrated form) configured to cool both the packages in common with each other.

[Configuration of Capacitor Board 10 on the Obverse Side]

As shown in FIG. 2, the capacitor 11 includes a positive side terminal 11a and negative side terminal 11b, and tip ends of these terminals are inserted into insertion holes 12a and 12b of the capacitor board 10, whereby the capacitor 11 is fixed to the capacitor board 10.

On the obverse side of the capacitor board 10 and, in the vicinity of the insertion hole 12a, insertion holes 13a and 14a for insertion and connection of connection terminals 16a and 17a (to be described later) on the reverse side thereof are formed and, from the positions of the insertion holes 13a and 14a to the position of the insertion hole 12a, a conductive pattern 15a is formed.

On the obverse side of the capacitor board 10 and, in the vicinity of the insertion hole 12b, insertion holes 13b and 14b for insertion and connection of connection terminals 16b and 17b (to be described later) on the reverse side thereof are formed and, from the positions of the insertion holes 13b and 14b to the position of the insertion hole 12b, a conductive pattern 15b is formed.

[Configuration of Circuit Board 20 on the Reverse Side]

As shown in FIG. 3, the circuit board 20 is configured as a double-sided circuit board, and the MCU 23 is solder-connected to the reverse side thereof. It should be noted that the MCU 23 includes a number of terminals, and each of these terminals is connected to a conductive pattern on the board. Presence of these terminals and conductive patterns is omitted on the drawings. On the reverse side of the circuit board 20 and, in the vicinity of the insertion hole 31 into which the positive side terminal P of the IPM 21 is to be inserted, the connection terminal 111 is arranged. This connection terminal 111 is inserted into the insertion hole 41 present in the vicinity of the insertion hole 31, and an insertion tip end thereof is solder-connected to the conductive pattern 51 on the obverse side, whereby the connection terminal 111 is electrically connected to the positive side terminal P of the IPM 21.

On the reverse side of the circuit board 20 and, in the vicinities of the insertion holes 32 to 34 into which the output terminals Ou, Ov, and Ow of the IPM 21 are to be inserted, the connection terminals 112 to 114 are arranged. These connection terminals 112 to 114 are respectively inserted into the insertion holes 32 to 34, and their insertion tip ends are respectively solder-connected to the conductive patterns 52 to 54 on the obverse side, whereby the connection terminal 112 to 114 are electrically connected to the output terminals Ou, Ov, and Ow of the IPM 21 respectively.

Further, on the reverse side of the circuit board 20 and, in the vicinity of the insertion hole 61 into which the positive side terminal P of the IPM 22 is to be inserted, the connection terminal 121 is arranged. This connection terminal 121 is inserted into the insertion hole 71 present in the vicinity of the insertion hole 61, and an insertion tip end thereof is solder-connected to the conductive pattern 81 on the obverse side, whereby the connection terminal 121 is electrically connected to the positive side terminal P of the IPM 22.

On the reverse side of the circuit board 20 and, in the vicinities of the insertion holes 62 to 64 into which the output terminals Ou, Ov, and Ow of the IPM 22 are to be inserted, the connection terminal 122 to 124 are arranged. These connection terminals 122 to 124 are respectively inserted into the insertion holes 62 to 64, and their insertion tip ends are respectively solder-connected to the conductive patterns 82 to 84 on the obverse side, whereby the connection terminals 122 to 124 are electrically connected to the output terminals Ou, Ov, and Ow of the IPM 22 respectively.

On the reverse side of the circuit board 20, into the insertion hole 91 present between the IPMs 21 and 22, the connection terminal 93 is inserted. An insertion tip end of this connection terminal 93 in the insertion hole 91 is solder-connected to the conductive pattern 92 on the obverse side, whereby the connection terminal 93 is electrically connected to the negative side terminals Nu, Nv, and Nw of the IPM 21 and, at the same time, is also connected to the negative side terminals Nu, Nv, and Nw of the IPM 22.

Although it is desirable that the aforementioned connection terminals 93, 111, 112 to 114, 121, and 122 to 124 be configured in the form of screw-terminal blocks, when the current flowing through each of the terminals is small, the aforementioned terminals may also be crimp terminals.

[Configuration of Capacitor Board 10 on the Reverse Side]

As shown in FIG. 3, on the reverse side of the capacitor board 10 and, in the vicinity of the insertion hole 12a into which the positive side terminal 11a of the capacitor 11 is to be inserted, the connection terminals 16a and 17a are arranged. These connection terminals 16a and 17a are respectively inserted into the insertion holes 13a and 14a present in the vicinity of the insertion hole 12a, and their insertion tip ends are solder-connected to the conductive pattern 15a on the obverse side, whereby the connection terminals 16a and 17a are electrically connected to the positive side terminal 11a of the capacitor 11.

On the reverse side of the capacitor board 10 and, in the vicinity of the insertion hole 12b into which the negative side terminal 11b of the capacitor 11 is to be inserted, the connection terminals 16b and 17b are arranged. These connection terminals 16b and 17b are respectively inserted into the insertion holes 13b and 14b present in the vicinity of the insertion hole 12b, and their insertion tip ends are solder-connected to the conductive pattern 15b on the obverse side, whereby the connection terminals 16b and 17b are electrically connected to the negative side terminal 11b of the capacitor 11.

[Wiring on the Reverse Side of Circuit Board 20 and on the Reverse Side of Capacitor Board 10]

As shown in FIG. 3, to the connection terminal 16a of the capacitor board 10, one end of a second conductive member such as a bus-bar 201 is fixed by screwing of a screw 100, and the other end of the bus-bar 201 is fixed to the connection terminal 111 of the circuit board 20 by screwing of a screw 100. The bus-bar 201 is a member obtained by forming a conductive metal into a plate-like shape, and has a large plate thickness and high stiffness. Through this bus-bar 201, the positive side terminal of the capacitor 11 and positive side terminal P of the IPM 21 are electrically connected to each other.

To the connection terminal 111 of the circuit board 20, one end of a third conductive member such as a lead wire 202 is fixed by screwing of the screw 100 together with the other end of the bus-bar 201, and the other end of the lead wire 202 is fixed to the connection terminal 121 of the circuit board 20 by screwing of a screw 100. Through this lead wire 202, the positive side terminal P of the IPM 21 and positive side terminal P of the IPM 22 are electrically connected to each other.

To the connection terminal 16b of the capacitor board 10, one end of the first conductive member such as the bus-bar 203 is fixed by screwing of a screw 100, and the other end of the bus-bar 203 is fixed to the connection terminal 93 of the circuit board 20 by screwing of a screw 100. The bus-bar 203 is a member obtained by forming a conductive metal into a plate-like and L-shaped article, and has a large plate thickness and high stiffness. Through this bus-bar 203, the negative side terminal of the capacitor 11 and negative side terminals Nu, Nv, and Nw of the IPM 21 and negative side terminals Nu, Nv, and Nw of the IPM 22 are electrically connected to each other. Accordingly, the circuit board 20 may also be supported on the bus-bars 201 and 203.

SUMMARY

As described above, regarding the one circuit board 20, the IPMs 21 and 22 are arranged in a state where the IPMs 21 and 22 are opposite from each other in point symmetry by 180° in terms of the rotational attitude with an insertion hole 91 and conductive pattern 92 held between them, whereby it is possible to make the negative side terminals Nu, Nv, and Nw of both the IPMs 21 and 22 respectively close to each other. By virtue of this closeness, it is possible to concentrate the negative side terminals Nu, Nv, and Nw of both the IPMs 21 and 22 at one place on the circuit board 20 with the insertion hole 91 and conductive pattern 92 intervening in the place. Owing to this concentration, it is possible to reduce the parasitic inductance existing on the negative side electrification path between the IPMs 21 and 22. Further, owing to such arrangement, it is possible to make the distance between the negative side terminals Nu of the IPMs 21 and 22 by which both the negative side terminals Nu are separated from each other less than the distance between the positive side terminal P of the IPM 21 and positive side terminal P of the IPM 22. It should be noted that the parasitic impedance of the wiring and electrification path between the positive side terminal P of the IPM 21 and positive side terminal P of the IPM 22 does not cause generation of noise, and hence although the distance between the positive side terminals P is long, no problem occurs.

Figure 4:
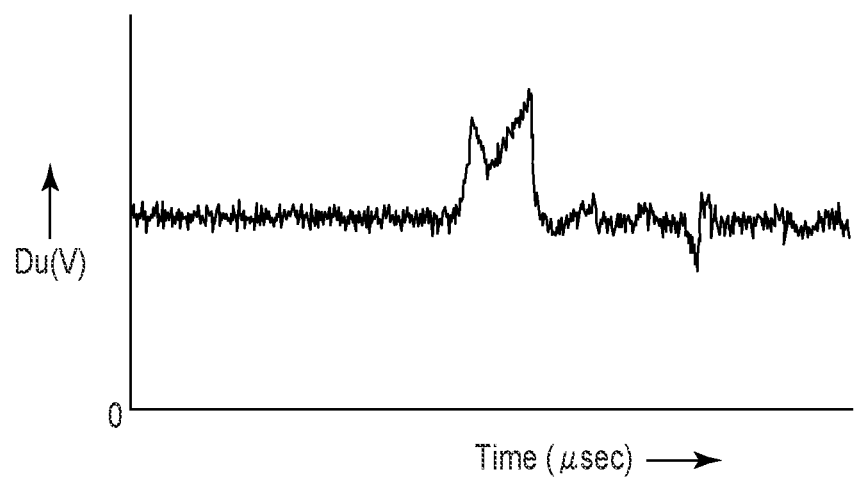
FIG. 4 is a view showing noise superimposed on a drive signal in a case where arrangement of IPMs is different from the embodiment.

The ground potential G of the operation voltage E of the MCU 23 is common to the potential G of each of the negative side terminals Nu, Nv, and Nw of the switching circuits 21a and 22a of the IPMs 21 and 22 as the reference potential at the time when the switching drive signals for the IPMs 21 and 22 are to be created. At this time, when the parasitic inductance existing on the negative side electrification path between the IPMS 21 and 22 is large, a potential difference occurs across the parasitic inductance due to a conduction current and the parasitic inductance. This potential difference varies the ground potential of each of the drive circuits 21b and 22b of the IPMs 21 and 22. As a result, a problem that large noise is superimposed on each of the drive signals 25 and 26 for switching to be supplied from the MCU 23 to the IPMs 21 and 22 occurs. As an example, as shown in FIG. 4, in a state where a drive signal Du for switching to be supplied to the switch element Tu+ of one of the IPMs 21 and 22 is in the off-state without any change, if any one of the switch elements of the other of the IPMs 21 and 22 carries out a switching operation, then at that timing, large noise is superimposed on the drive signal Du for switching to be supplied to the switch element Tu+ of one the IPMs 21 and 22. If the noise grows large to make the voltage of the drive signal as high as the turn-on level, a malfunction causing the fact that the switch element Tu+ is turned on at such timing that the switch element Tu+ should normally be in the off-state occurs. As a result of occurrence of such a malfunction, in the worst case, there is a possibility of upper side and lower side switching elements short-circuiting to thereby make a large current flow and destroy the IPM.

Figure 5:
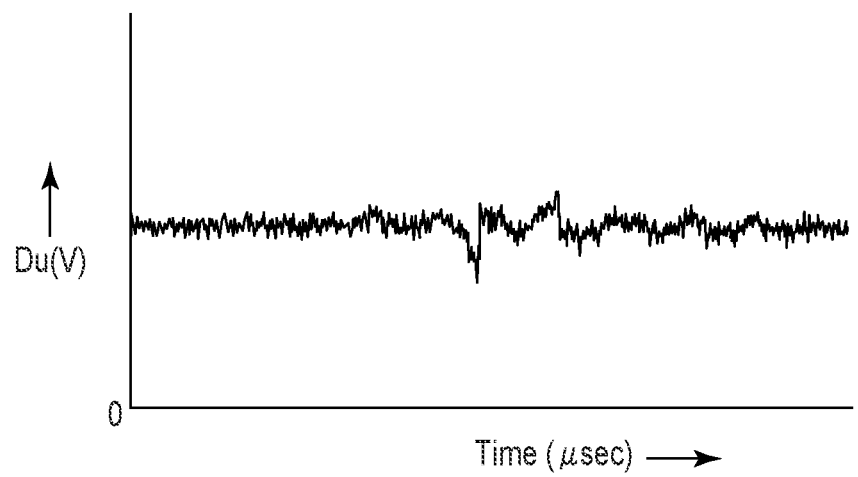
FIG. 5 is a view showing a waveform of a drive signal in which noise in the embodiment is reduced.

In this embodiment, the negative side terminals Nu, Nv, and Nw of both the IPMs 21 and 22 are concentrated at one place on the circuit board 20 with the insertion hole 91 and conductive pattern 92 intervening in the place, whereby the parasitic inductance existing on the negative side electrification path between the IPMs 21 and 22 is reduced, and hence it is possible to reduce the noise superimposed on the drive signals for switching to be supplied from the MCU 23 to the IPMs 21 and 22. Thereby, as shown in FIG. 5, large noise is not superimposed on the drive signal Du for switching to be supplied to the switch element Tu+ of one of the IPMs 21 and 22 even when the switching element of the other of the IPMS 22 and 21 operates. Thereby, it is possible to prevent malfunctions of the IPMs 21 and 22 due to noise from occurring.

Further, owing to the configuration in which the capacitor board 10 and circuit board 20 are connected to each other by the bus-bars 201 and 203 each having high stiffness, it is possible to firmly integrate the capacitor board 10 and circuit board 20 with each other into one body.

Modified Example

Although in the embodiment described above, the configuration in which as the second conductive member, the bus-bar 201 is used, as the third conductive member, the lead wire 202 is used and, as the first conductive member, the conductive pattern 92 and bus-bar 203 are used is employed, it is not always necessary to do so, and a configuration in which lead wires are used in place of bus-bars or configuration in which bus-bars are used in place of lead wires may also be employed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motor drive apparatus of a motor including a plurality of phase windings in a mutually unconnected state, comprising:
    a converter which converts AC voltages into a DC voltage;
    a capacitor connected to the converter;
    a first inverter which controls electrification of portions between the capacitor and one ends of the phase windings; and
    a second inverter which controls electrification of portions between the capacitor and the other ends of the phase windings, wherein
    the first and second inverters are first and second modules each of which is configured in such a manner that a switching circuit including a positive side terminal and negative side terminals is accommodated in one package, and the positive side terminal and the negative side terminals of the switching circuit are arranged on the package in a predetermined order together with a plurality of output terminals to be connected to the phase windings, and the first and second modules are arranged on one circuit board in a state where the negative side terminals of the first and second modules are respectively close to each other, and
    the motor drive apparatus further comprises a first conductive member which connects each of the negative side terminals of the first and second modules and a negative side terminal of the capacitor to each other.

2. The motor drive apparatus of claim 1, further comprising:
    a second conductive member which connects the positive side terminal of the first module and the positive side terminal of the capacitor to each other; and
    a third conductive member which connects the positive side terminals of the first and second modules to each other.

3. The motor drive apparatus of claim 1, further comprising a control unit which is arranged on the circuit board and controls the first and second inverters.

4. The motor drive apparatus of claim 3, wherein
    the ground potential of an operation voltage of the control unit is common to the potential of the negative side terminal of each of the switching circuits of the first and second modules.

5. The motor drive apparatus of claim 1, wherein
    the first conductive member includes a conductive pattern arranged between the first and second modules on the circuit board and electrically connected to the negative side terminals of the first and second modules, and
    the first and second modules are arranged on the circuit board in a state where the first and second modules are opposite from each other in point symmetry by 180° in terms of the rotational attitude with the conductive pattern held between the first and second modules.

6. The motor drive apparatus of claim 5, wherein
    the first conductive member is constituted of the conductive pattern and a bus-bar which connects the conductive pattern and the negative side terminal of the capacitor to each other,
    the second conductive member is a bus-bar or a lead wire, and
    the third conductive member is a bus-bar or a lead wire.

7. The motor drive apparatus of claim 1, further comprising a capacitor board on which the capacitor is arranged.

8. The motor drive apparatus of claim 1, wherein
    the first module and the second module possess configurations identical to each other.

9. The motor drive apparatus of claim 1, wherein
    each of the first module and the second module includes a drive circuit which drives the switching circuit of each of the first and second modules.

* * * * *